United States Patent [19]

Ziegelhoffer

[11] Patent Number: 5,211,619

[45] Date of Patent: May 18, 1993

[54] CLAMP ASSEMBLY FOR BAG PRODUCING MACHINE

[75] Inventor: Paul Ziegelhoffer, Greenleaf, Wis.

[73] Assignee: Paper Converting Machine Company, Green Bay, Wis.

[21] Appl. No.: 804,244

[22] Filed: Dec. 9, 1991

[51] Int. Cl.[5] .......................... B31B 23/10; B32B 1/64
[52] U.S. Cl. ...................................... 493/194; 493/205; 493/208
[58] Field of Search .............. 493/194, 203, 205, 208, 493/209, 341; 156/515, 583.1

[56] References Cited

U.S. PATENT DOCUMENTS

| | | | |
|---|---|---|---|
| 4,244,772 | 1/1981 | Achelpohl | 156/515 |
| 4,609,367 | 9/1986 | Savich et al. | 493/194 |
| 4,820,254 | 4/1989 | Ziegelhoffer | 493/194 |

Primary Examiner—William E. Terrell
Attorney, Agent, or Firm—Tilton, Fallon, Lungmus & Chestnut

[57] ABSTRACT

In a bag making machine utilizing clamp bar assemblies in combination with a sealing drum, the improved clamp assembly wherein the clamp is coupled to a channel bight, the clamp and channel being related to the conventional pivot shaft by means of a circumferentially-extending pivot pin and with clearance between the channel and pivot shaft.

6 Claims, 2 Drawing Sheets

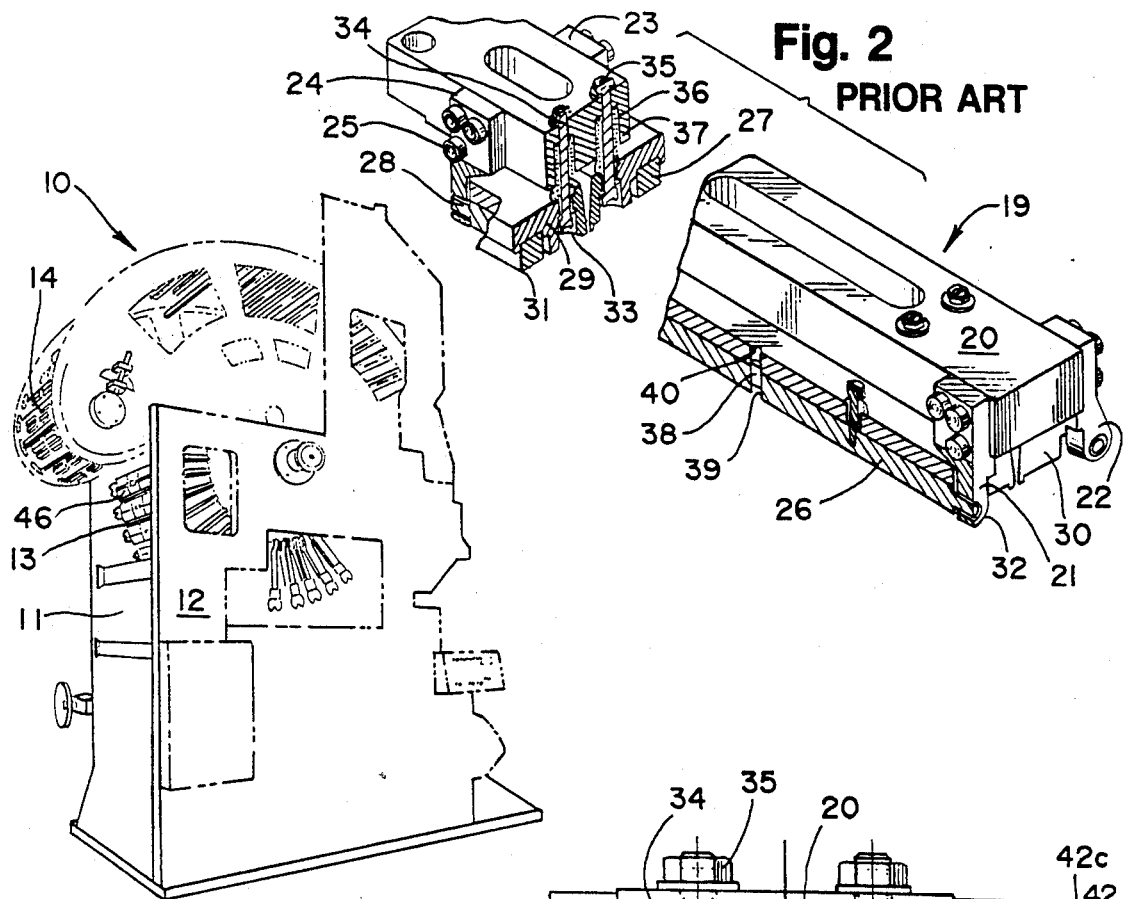
Fig. 2 PRIOR ART
Fig. 1 PRIOR ART
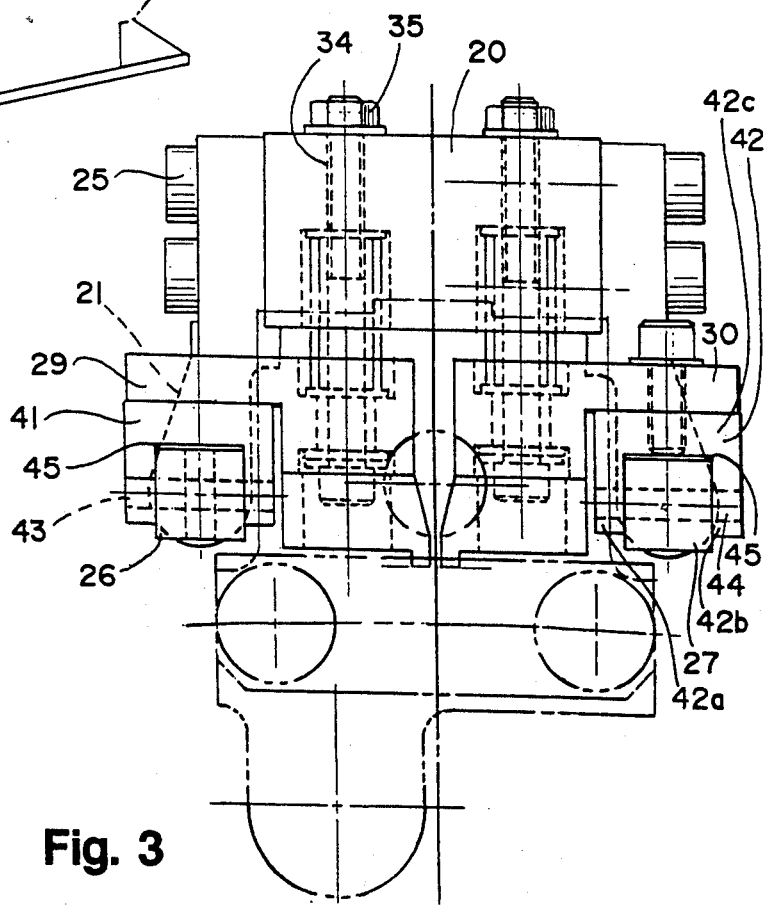
Fig. 3

CLAMP ASSEMBLY FOR BAG PRODUCING MACHINE

BACKGROUND AND SUMMARY OF INVENTION

This invention relates to a clamp assembly for a bag sealing machine and, more particularly, to a clamp assembly which is uniquely mounted for cooperation with a sealing drum in developing a stream of plastic bags. This invention is an improvement on my U.S. Pat. No. 4,820,254.

Both this invention and the '254 patent deal with the type of bag making machine described in my U.S. Pat. No. 4,609,367. This utilized clamp assemblies to hold the polyethylene web against the sealing drum during the sealing and cutoff process. Each pair of clamps held the longitudinally folded polyethylene web on the leading and trailing edges of what were to become consecutive segments of the web. A cutoff and sealing wire was moved on a generally radial path that allowed it to pass between the pair of clamps—to create the individual bags. Exemplary of the type of bag made on such machinery was the well-known reclosable bag which employed fastener strips of an interlocking nature.

The prior art machines, and those today, for that matter, generally run two-wide. In such machines, each clamp assembly consists of four clamping surfaces. Prior to the invention of the '254 patent, each clamping surface was allowed to pivot only radially to align itself with the sealing drum surface. Thus, there was no provision for axially aligning the clamp. According to the '254 patent, axial adjustment was achieved by eliminating the rigid securement of the clamps to the pivot shafts and instead providing a radially-extending pivot pin connection therebetween with a slight amount of clearance between the pivot pin on one member and the pin receiving opening on the other member. Although this provided the desired ability for axial adjustment, it did not achieve entirely the desired reduction of set-up time. For example, it took twelve hours to set up the normally 70-80 clamp bar assemblies of the '254 patent while with the instant invention, this has been reduced to less than half the time—often just two to three hours.

According to the invention, this significant advantage has been achieved by (1) adding a channel between the clamp and the pivot shaft, (2) providing a circumferentially-extending (i.e., longitudinally in the sense of web travel with the drum) pivot connection between the arms of the channel and pivot shaft, and (3) providing a clearance between the bight of the channel and the confronting surface of the pivot shaft.

Other objects and advantages of the invention may be seen in the details of the ensuing specification.

BRIEF DESCRIPTION OF DRAWING

The invention is described in conjunction with an illustrative embodiment in the accompanying drawing, in which FIG. 1 is a fragmentary perspective view of the prior art bag making machine but which is also employed with the inventive clamp assemblies;

FIG. 2 is a perspective view, partially broken away of a clamp bar assembly of the prior art '254 patent;

FIG. 3 is a sectional view of the clamp assembly of the instant invention

DETAILED DESCRIPTION

Prior Art

Figure 4:
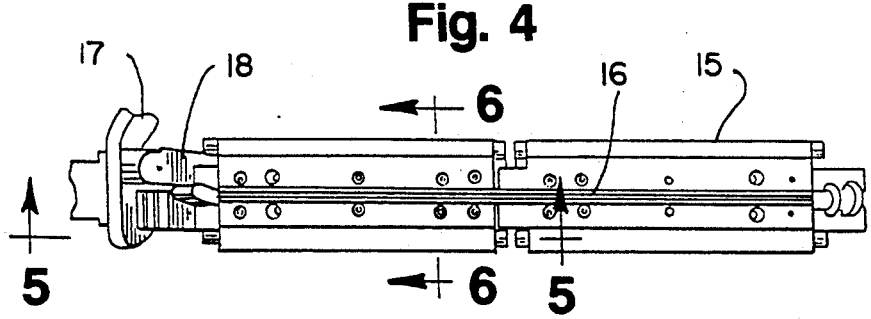
FIG. 4 is a top plan view of one clamp assembly which embodies four clamps for the above referred to "two-wide" operation.

As indicated previously, the bag making art is well established—such bags being used to receive sandwiches, vegetables, etc. The machine depicted at 10 in FIG. 1 includes a pair of side frames 11 and 12, a sealing drum 13 mounted for rotation therein and a "banana" cam arrangement 14 which carries a plurality of clamp assemblies 15 (see FIG. 4) which coact with the sealing drum to immobilize the polyethylene web during the sealing and cutoff operation. It will be appreciated that as the sealing wire (not shown) moves into the space 16 between leading and trailing clamps, the heat from the wire not only transversely severs the continuous web but also provides a side seal on the trailing edge of the leading bag and another on the leading edge of the web portion which is to become the trailing bag. Inasmuch as the web has been transversely folded before reaching the sealing drum, this results in a bag closed along three sides with the fourth side providing the mouth.

Except for certain details of the clamp mounting, the showings in FIGS. 1 and 4 are characteristic of the prior art. For example, it is conventional to provide chain loops such as is seen in fragmentary form at 17 in the left hand portion of FIG. 4 and to provide the clamp assembly with an arm portions at 18 connected to the chain loop for cooperative movement therewith.

Referring now to FIG. 2, it was and is conventional practice to provide a multiple width machine such as a "two-wide" machine, i.e., one servicing two folded polyethylene webs so as to develop two streams of bags—along with other width machines. Each stream was provided by a series of clamp assemblies generally designated 19 in FIG. 2. This was, in effect, one half of the showing of the overall clamp assembly 15 of FIG. 4.

Each assembly included a clamp mounting crossbar 20 which was the portion equipped with the arms 17 of FIG. 4. Fastened to the crossbar 20 were four pivot brackets 21, 22, 23 and 24 which were arranged in two axially spaced pairs, viz., 21 and 22 at the right end of FIG. 3 and 23 and 24 at the left end. Thus, the brackets in each pair were aligned on opposite sides of the clamp mounting bar 20 and the bracket of one pair was axially aligned with the bracket of the other pair, viz., 24 was aligned with 21 and 23 was aligned with 22. The pivot brackets 21-24 were suitably secured to the clamp mounting bar 20 as by bolts 25.

The brackets 21 and 24 (being on the near side of the clamp mounting bar in FIG. 2) supported a pivot shaft 26 while the brackets 22 and 23 supported a second pivot shaft 27. The ends of each pivot shaft were equipped with cylindrical stub ends as at 28 for rotatable movement within the associated brackets.

Each pivot shaft was equipped with a clamp as at 29 relative to the pivot shaft 26 and 30 relative to the pivot shaft 27. It will be noted that the pivot shafts and clamps were complementarily contoured—see, for example, the portion designated 31 in the lower right hand portion of FIG. 2. This provided a snug fit so that the clamp 29 or 30, as the case may be, rotated with the associated pivot shaft 26 or 27 which had its ends as at 28 mounted within bronze bushings 32—see the right hand portion of FIG. 2.

Additionally, the clamp members or bars 29 and 30 were resiliently supported each by a pair of spring loaded adjusting screws. As can be seen best in the left hand portion of FIG. 2, the clamp 29 had an opening 33 through which an adjusting screw 34 passed. The upper end of the adjusting screw extended through and above the clamp mounting bar 20 and was secured in position by a nut 35 cooperating with the screw head. The passageway through the clamp mounting bar 20 was enlarged as at 36 to accommodate a coiled spring 37.

This much was conventional prior to the '254 patent. In that patent, there was provided a pivot pin 38 (see the central lower portion of FIG. 2) for this connection. The pivot shaft 26, for example, had the pivot pin 38 press-fit into an opening 39 located midway of the length of the pivot shaft 265. The clamp 29 was positioned on the pivot shaft 26 through an opening 40 which was slightly oversized.

The Invention

The invention can be quickly appreciated from FIG. 3. The basic environment is the same—a crossbar 20 is provided to support brackets 21 and 22. Again, in the same way, the brackets 21 (and 24—see FIG. 5) and 22 (and 23—also see FIG. 5) support, respectively, the pivot shafts 26 and 27.

In contrast to the '254 showing of FIG. 2, each pivot shaft 26, 27 is not in contact with its associated clamp 29, 30 but instead is partially encased in a channel as at 41 and 42.

Securing each channel 41, 42 to its associated pivot shaft 26, 27 for slight rotational movement is a pivot pin 43, 44. In the illustration given, each pin is fixed within its associated pivot shaft but has a slip-fit relative to its associated channel. Each channel has radially inwardly extending arms as at 42a and 42b connected by a bight portion 42c. It will be noted that a clearance space 45 exists between the confronting faces of the bight 42c and the outer surface of the pivot shaft 27. A similar clearance space 45 is provided between the pivot shaft 26 and the channel 41. Advantageously, this clearance space may be of the order of about 0.025–0.050".

Operation—Set-Up

Figure 6:
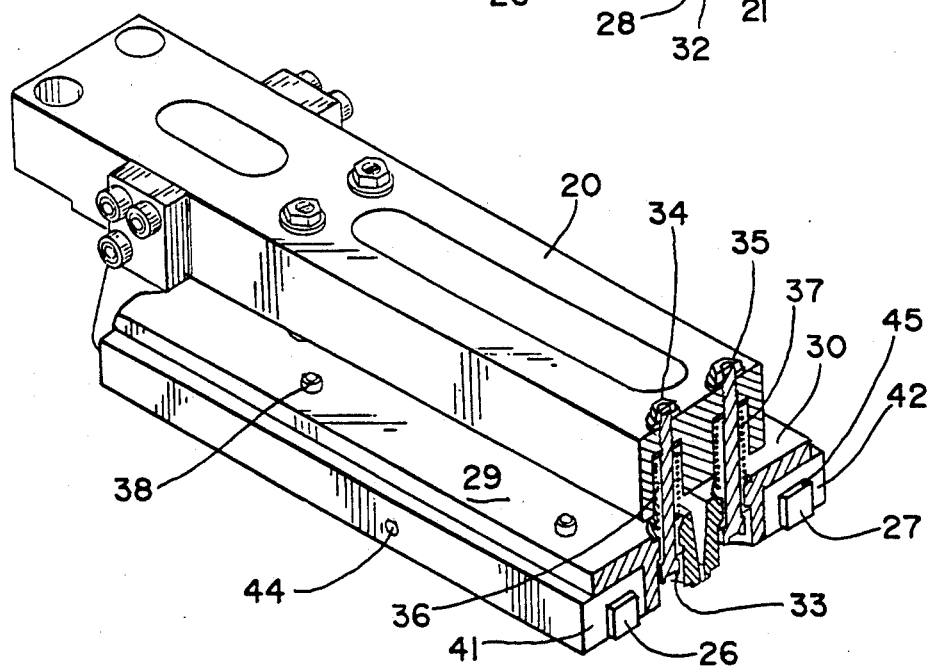
FIG. 6 is a fragmentary perspective view partially broken away such as would be seen along the sight line 6—6 of FIG. 4.

The installation of a new pair of clamps 29, 30 is significantly simpler according to the instant invention. The clamps 29, 30 are fixed to the channels 41, 42 by means of spring loaded adjusting screws. As can be seen in the right hand portion of FIG. 6, the clamp 29 again has an opening 33 through which an adjusting screw 34 passes. The upper end of the adjusting screw extending through and above the cross bar and is again secured in position by a nut 35 cooperating with the screw head. The passageway through the clamp mounting cross bar 20 is enlarged as at 36 to again accommodate a coiled spring 37. The spring loading of the clamps 29, 30 to the cross bar 20 is conventional.

Figure 5:
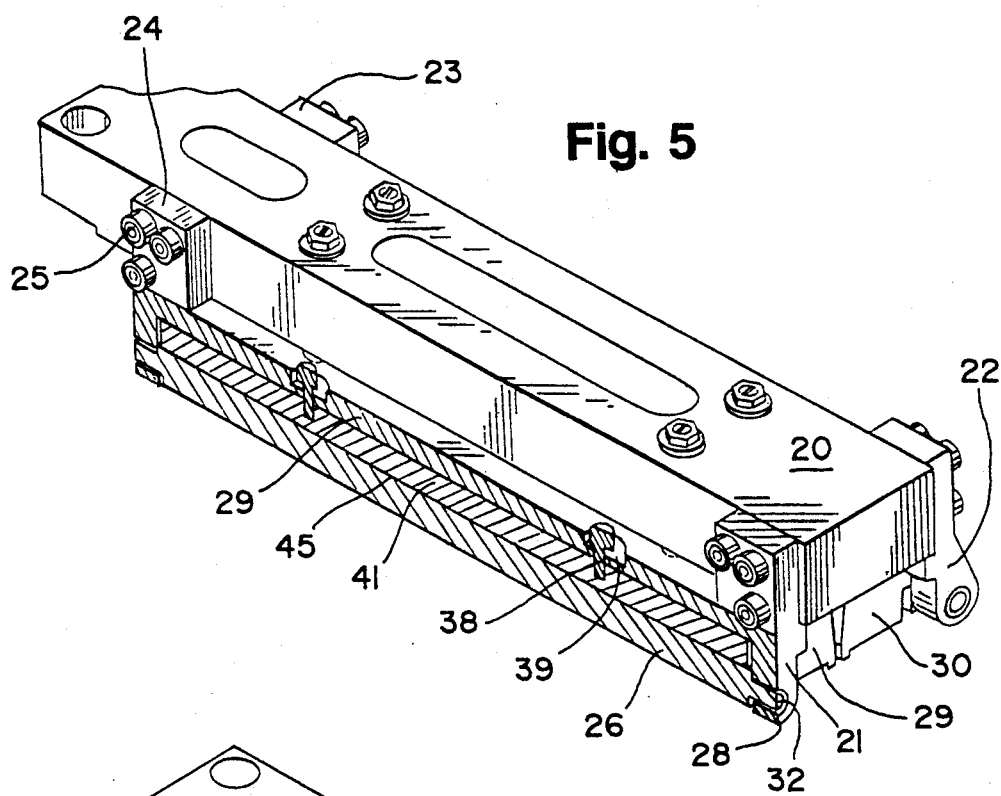
FIG. 5 is a perspective view partially broken away as would be seen along the sight line 5—5 of FIG. 4.

In turn, the clamps 29, 30 are secured to the channels 41, 42 by means of bolts 38 equipped with springs 39 (see the central right hand portion of FIG. 5).

By removing the adjusting screws 34, the clamp-equipped channel 29, 41, can be removed and a new clamp-equipped channel installed—as for replacement, different sizing, etc. By combining the clamp and channel as a unit and by introducing the clearance spacing 45, I avoid the problem of tight machining tolerances which were necessary when the clamp was positioned immediately adjacent the pivot shaft. Now, the pivot shaft can be machined out of key stock and does not have to be draw-filed in order to provide the tolerance required in the '254 construction.

Also, through the use of the pivot pin 44, there is no danger of the channel being detached from the pivot shaft during operation.

Operation—Machine Running

As the chain loops 17 track the rotating drum 13, the clamp assemblies including the cross bar 20, the pivot shafts 26, 27, the channels 41, 42 and the clamps 29, 30 are able to adopt a position of full bearing pressure on the folded polyethylene web to insure immobilizing the same for leak-proof sealing and severance by the hot wire. The inventive clamp assemblies have two degrees of rotation—one about the axes of the stub ends 28 as before and a second about the axes of the pivot pins 44.

The easy replacement of clamp assemblies as indicated above facilitates particularly the changeover in bag sizes particularly where the machines are employed for producing reclosable bags where an interlocking feature has to be accommodated—see, for example, the grooves 46 in the central left hand portion of FIG. 1.

I claim:

1. In a machine for producing a stream of plastic bags including a frame, a drum mounted for circumferential movement on said frame for rotation about a predetermined axis, and a pair of parallel chain loops one on each side of said drum carrying cross clamping and cutoff sealing wire means to develop individual bags from a continuous, folded plastic web, an improved clamp mechanism comprising:

a relatively axially elongated clamp mounting crossbar extending generally between said chain loops and having an arm portion at each end connected to said chain loops, a pair of clamps resiliently coupled to said crossbar and positioned on the radially inward side thereof whereby said clamps are adapted to assume different radial attitudes relative to said drum, two pairs of axially-spaced apart pivot brackets fixed to said crossbar and extending radially inwardly therefrom, the brackets in each pair being aligned on opposite sides of said crossbar and a bracket of one pair being axially aligned with a bracket of the other pair, a pivot shaft on each side of said crossbar pivotally mounted in said axially aligned brackets, a generally circumferentially extending pivot pin fixed in each pivot shaft, and a channel mounted on each pivot shaft and equipped with openings receiving said pivot pin, said channel having a bight portion spaced slightly radially outwardly of said pivot shaft to provide a clearance space, said channel being coupled to an associated clamp whereby said channel and associated clamp are adapted to assume different pivotal positions relative to said pivot shaft and therefore said crossbar.

2. The machine of claim 1 in which said clearance space is of the order of about 0.025" to about 0.050".

3. The machine of claim 1 in which said clamps are equipped with circumferentially-extending grooves in the surfaces thereof confronting said drum whereby said machine is adapted to provide bags having tongue and groove lockable closures.

4. The machine of claim 1 in which each of said channels is rigidly connected to its associated clamp.

5. A clamp assembly for a bag making machine comprising a relatively elongated crossbar, a pair of transversely spaced pivot shafts pivotally connected to opposite sides of said crossbar for pivotal movement about longitudinal axes, channel mounted on each pivot shaft each channel being equipped with a clamp for clamping bag material, and a transversely extending pivot pin interconnecting each channel with its associated pivot shaft for pivotal movement of the channel about a transverse axis, each said channel and pivot shaft having confronting spaced apart surfaces to permit pivotal movement of said channel relative to said associated pivot shaft.

6. The assembly of claim 5 in which said pivot pin is located generally midway of the length of said pivot shaft.

* * * * *